(12) United States Patent
Shin et al.

(10) Patent No.: US 11,709,646 B2
(45) Date of Patent: *Jul. 25, 2023

(54) WIRELESS DEVICE

(71) Applicant: LG ELECTRONICS INC., Seoul (KR)

(72) Inventors: Byounghyun Shin, Seoul (KR); Eunjung Lee, Seoul (KR); Jinseong Kim, Seoul (KR); Kyungnam Bae, Seoul (KR); Jeonghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

This patent is subject to a terminal disclaimer.

(21) Appl. No.: 16/914,237

(22) Filed: Jun. 26, 2020

(65) Prior Publication Data

US 2021/0311685 A1   Oct. 7, 2021

(30) Foreign Application Priority Data

Apr. 6, 2020  (KR) .................. 10-2020-0041771

(51) Int. Cl.
*G06F 3/14* (2006.01)
*H04W 4/80* (2018.01)
(Continued)

(52) U.S. Cl.
CPC .......... *G06F 3/1454* (2013.01); *H04L 67/131* (2022.05); *H04W 4/80* (2018.02); *H04W 36/0007* (2018.08); *H04W 36/165* (2013.01)

(58) Field of Classification Search
CPC .......... G06F 3/14; G06F 3/1454; G06F 9/452; G06F 16/10; G06F 16/27; G06F 11/2056; H04L 67/06; H04L 67/24; H04L 67/32; H04L 67/38; H04L 67/104; H04L 67/1002; H04L 67/1095; H04L 29/06; H04L 65/00; H04L 29/08; A63D 13/00; A63D 13/34;
(Continued)

(56) References Cited

U.S. PATENT DOCUMENTS 7,499,063 B2 * 3/2009 Ishiguchi ............ G09G 3/3648
                                                          345/98
10,172,178 B2   1/2019 Park et al.
(Continued)

OTHER PUBLICATIONS

European Patent Office Application Serial No. 20181142.9, Search Report dated Nov. 23, 2020, 9 pages.

*Primary Examiner* — James N Fiorillo
(74) *Attorney, Agent, or Firm* — Lee, Hong, Degerman, Kang & Waimey PC (57) ABSTRACT

Disclosed herein is a wireless device including a display, a wireless communication interface configured to wirelessly perform communication with an external device, and a processor configured to activate any one of a first connection mode in which connection with the external device is established through an access point or a second connection mode in which direct connection with the external device is established, based on a network environment and receive, from the external device, image data corresponding to a source image being displayed on the external device according to the activated connection mode and display, on the display, a mirroring image based on the received image data.

18 Claims, 8 Drawing Sheets

(51) Int. Cl.
  *H04W 36/00* (2009.01)
  *H04W 36/16* (2009.01)
  *H04L 67/131* (2022.01)

(58) Field of Classification Search
  CPC ......... H04W 4/06; H04W 4/80; H04W 84/10; H04W 92/18; H04W 36/00; H04W 36/0007; H04W 36/16; H04W 36/18–22; H04W 36/165; H04W 72/005; H04W 76/10; H04W 76/14; H04W 76/40; H04W 8/00; H04W 8/02; H04W 8/005; H04W 8/14; H04N 21/632; H04N 21/43637; H04N 5/93; H04N 5/355; H04N 5/2351; H04N 5/2355
  USPC ........................................................ 709/231
  See application file for complete search history.

(56) References Cited

U.S. PATENT DOCUMENTS

| | | | | |
|---|---|---|---|---|
| 2013/0148162 | A1* | 6/2013 | Park | H04W 76/15 358/1.15 |
| 2014/0003342 | A1* | 1/2014 | Sheriff | H04W 36/24 370/328 |
| 2014/0112636 | A1* | 4/2014 | Huang | H04N 21/234309 386/230 |
| 2014/0179423 | A1* | 6/2014 | Deng | A63F 13/355 463/31 |
| 2015/0067549 | A1* | 3/2015 | Chang | G06F 3/0488 715/761 |
| 2015/0179130 | A1* | 6/2015 | Smadi | G09G 5/005 345/520 |
| 2015/0304484 | A1* | 10/2015 | Halmstad | H04W 76/10 455/419 |
| 2016/0173939 | A1* | 6/2016 | Iwami | H04L 12/2814 725/139 |
| 2016/0198198 | A1* | 7/2016 | Iwami | H04N 21/2343 725/116 |
| 2016/0345254 | A1* | 11/2016 | Iwami | H04W 76/14 |
| 2017/0064008 | A1* | 3/2017 | Sakabe | H04W 12/08 |
| 2017/0111948 | A1* | 4/2017 | Matsushita | H04L 63/029 |
| 2017/0249919 | A1* | 8/2017 | Bae | H04N 1/00442 |
| 2017/0264676 | A1 | 9/2017 | Rajamani et al. | |
| 2017/0332210 | A1* | 11/2017 | Iwami | H04W 84/12 |
| 2018/0069606 | A1* | 3/2018 | Jung | H04B 7/0617 |
| 2018/0098018 | A1* | 4/2018 | Cho | H04N 21/4316 |
| 2018/0295624 | A1* | 10/2018 | Katar | H04W 48/16 |
| 2018/0310239 | A1* | 10/2018 | Iwami | H04W 40/04 |
| 2018/0324876 | A1* | 11/2018 | Iwami | H04W 76/10 |
| 2019/0199901 | A1* | 6/2019 | Kondo | G06F 3/14 |
| 2019/0200281 | A1* | 6/2019 | Inohiza | H04W 76/10 |
| 2019/0373464 | A1* | 12/2019 | Chari | H04L 9/0643 |
| 2020/0344084 | A1* | 10/2020 | Shribman | H04L 63/0272 |
| 2021/0100069 | A1* | 4/2021 | Saldin | H02J 9/06 |

\* cited by examiner

WIRELESS DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0041771, filed on Apr. 6, 2020, the contents of which are all hereby incorporated by reference herein in its entirety.

BACKGROUND

The present disclosure relates to a wireless device and, more particularly, to a wireless device for grasping a network environment and determining a connection method with an external device.

Screen mirroring technology refers to technology for sharing a screen between devices.

For screen mirroring, two devices share a screen using any one of a peer-to-peer (P2P) connection mode using P2P without a router and an access point (AP) connection mode using a router.

In the case of the P2P connection mode, after device search through P2P scan, a request for connection to the searched device, P2P connection and real time streaming protocol (RTSP) connection, a mirroring image is displayed on a sink device.

In this case, it takes the longest time to perform a device search process through P2P scan, and a search time considerably significantly varies according to a surrounding wireless environment.

In the case of the AP connection mode using the router, the P2P scan process is not necessary and thus a connection time may be shortened. However, the quality of the mirroring image may be very poor according to the performance of the router.

In addition, even in the case of a product including a router having excellent performance, when many devices are connected to the router or a small number of devices uses a lot of data, the quality of the mirroring image may be very poor.

SUMMARY

An object of the present disclosure is to provide a wireless device capable of determining a connection mode according to a network environment and providing a screen sharing service in the determined connection mode.

Another object of the present disclosure is to provide a wireless device capable of dynamically selecting a connection mode according to a network environment.

A wireless device according to the embodiment of the present disclosure includes a display, a wireless communication interface configured to wirelessly perform communication with an external device, and a processor configured to activate any one of a first connection mode in which connection with the external device is established through an access point or a second connection mode in which direct connection with the external device is established, based on a network environment and receive, from the external device, image data corresponding to a source image being displayed on the external device according to the activated connection mode and display, on the display, a mirroring image based on the received image data.

DETAILED DESCRIPTION OF THE EMBODIMENTS

Figure 1:
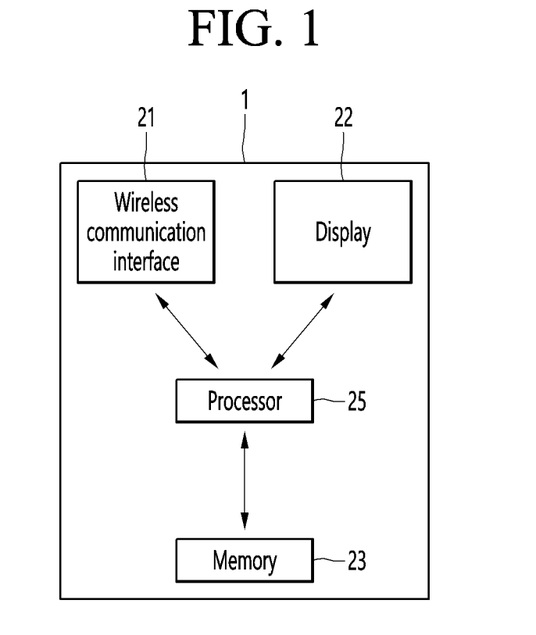
FIG. 1 is a view illustrating the configuration of a wireless device according to an embodiment of the present disclosure.

FIG. 1 is a view illustrating the configuration of a wireless device according to an embodiment of the present disclosure.

The wireless device 1 described below may be any one of a TV, a smartphone, a tablet PC, a navigation system, a wearable device and a PC.

The wireless device 1 shown in FIG. 1 may be any one of a source device 10 and a sink device 20, both of which will be described below.

Referring to FIG. 1. the wireless device 1 may include a wireless communication interface 21, a display 22, a memory 23 and a processor 25.

The wireless communication interface 21 may transmit/receive a wireless signal and, for example, implement a physical layer according to an IEEE 802 system. The wireless communication interface 21 may be referred to as a transceiver.

The wireless communication interface 21 may perform communication with an external device through wireless communication. The wireless communication interface 21 may perform short range communication with an external device.

To this end, the wireless communication interface 21 may support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct or Wireless USB (Wireless Universal Serial Bus) technology.

The display 22 may generate a driving signal by converting an image signal, a data signal or an OSD signal processed by the processor 25 or an image signal or a data signal received through the wireless communication interface 21 into R, G and B signals.

The processor 25 may control operation of the wireless communication interface 21, the memory 23 and the display 22.

The processor 25 may be electrically connected to the wireless communication interface 21 to implement a physical layer and/or an MAC layer according to the IEEE 802 system.

In addition, the processor 25 may be configured to perform operation of encoding and decoding audio/video for a WFD (Wi-Fi Direct) service.

The memory 23 may be included in the processor 25 or may be installed outside the processor 25 and may be connected with the processor 25 by a well-known unit. Although not shown, the wireless device 1 may further include a sound output unit for outputting sound.

Figure 2:
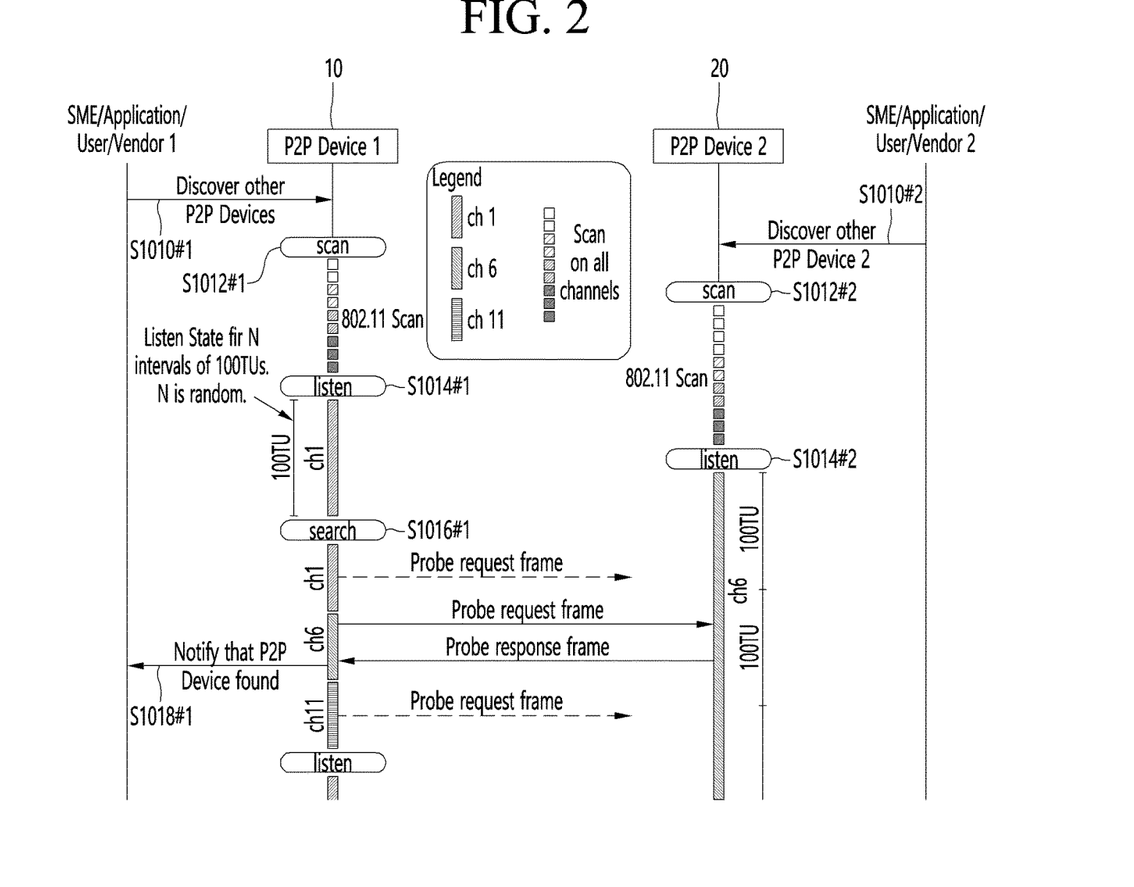
FIG. 2 is a view illustrating the flow of a device discovery process according to an embodiment of the present disclosure.

FIG. 2 is a view illustrating the flow of a device discovery process according to an embodiment of the present disclosure.

Particularly, FIG. 2 shows the flow of a discovery process between devices in a peer-to-peer (P2P) connection mode between P2P Device 1 10 and P2P Device 2 20.

P2P Device 1 10 may be referred to as a source device and P2P Device 2 20 may be referred to as a sink device.

Referring to FIG. 2, the neighbor discovery process of FIG. 2 may start by an instruction of a station management entity (SME)/application/user/vendor (S1010), and may be divided into a scan phase S1012 and find phases S1014 to S1016.

The scan phase S1012 includes operation of scanning all available wireless channels according to an 802.11 method. Therefore, the P2P device may confirm the best operation channel.

The find phases S1014 to S1016 include a listen mode S1014 and a search mode S1016, and the P2P device alternately repeats the listen mode S1014 and the search mode S1016.

The P2P devices 10 and 20 may perform active search using a probe request frame in the search mode S1016 and limits the search range to social channels such as channels 1, 6 and 11 (2412, 2437 and 2462 MHz) for fast search.

In addition, the P2P devices 302 and 304 are maintained in a reception state by selecting only one of three social channels in the listen mode S1014.

At this time, when a probe request frame transmitted by another P2P device (e.g., 10) in the search mode is received, the P2P device (e.g., 20) responds with a probe response frame.

The time of the listen mode S1014 may be randomly given (e.g., 100, 200, 300 TU (Time Unit) msec). The P2P devices may continuously repeat the search mode and the reception mode to reach a common channel. The P2P device may discover another P2P device and then find/exchange a device type, a manufacturer or a familiar device name using a probe request frame and a probe response frame, in order to be selectively coupled to the P2P device.

When a neighbor P2P device is discovered through a neighbor discovery process and necessary information is obtained, the P2P device (e.g., 10) may notify the SME/application/user/vendor of P2P device discovery (S1018).

After the device discovery process, the P2P devices 10 and 20 establish P2P connection and then perform a screen mirroring function through a Real Time Streaming Protocol (RTSP).

P2P Device 1 10 is a source device which transmits image data to P2P device 2 20 which is a sink device, and P2P Device 2 20 displays a mirroring image based on the received image data.

However, in a P2P connection mode, it takes a considerable time to perform a device search process through P2P scan, and the search time significantly varies according to the surrounding wireless environment.

Figure 3:
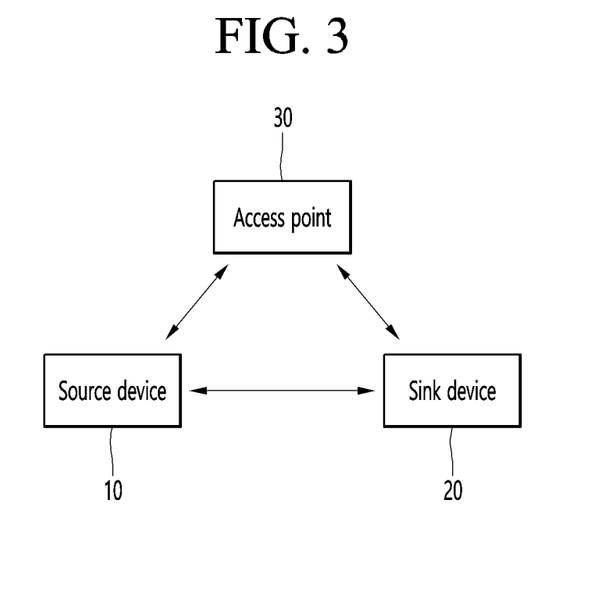
FIG. 3 is a view illustrating an access point (AP) connection mode which is a connection method between devices through an access point.

FIG. 3 is a view illustrating an access point (AP) connection mode which is a connection method between devices through an access point.

The AP connection mode may refer to a mode in which the source device 10 and the sink device 20 are connected through an access point 30 (router).

That is, the P2P connection mode may refer to a mode in which the source device 10 and the sink device 20 are directly connected without the access point 30, and the AP connection mode may be refer to a mode in which the source device 10 and the sink device 20 are connected through the access point 30 as an intermediary.

In the AP connection mode, a screen mirroring function between the source device 10 and the sink device 20 may be performed through the access point 30. That is, the source device 10 may transmit the image data of the displayed image to the sink device 20 through the access point 30.

In the AP connection mode, since there is no P2P scan process of the P2P connection mode, a time required to connect the devices may be shortened, but the quality of the mirroring image may be very poor according to the performance of the access point 30.

In addition, even if the performance of the access point 30 is excellent, when many devices are connected to the access point 30 or a small number of devices uses a lot of data, the quality of the mirroring image may be very poor.

In the embodiment of the present disclosure, an example of switching a connection mode according to a communication environment between the source device 10 and the sink device 20 or a communication environment of the access point 30 will be described.

Figure 4:
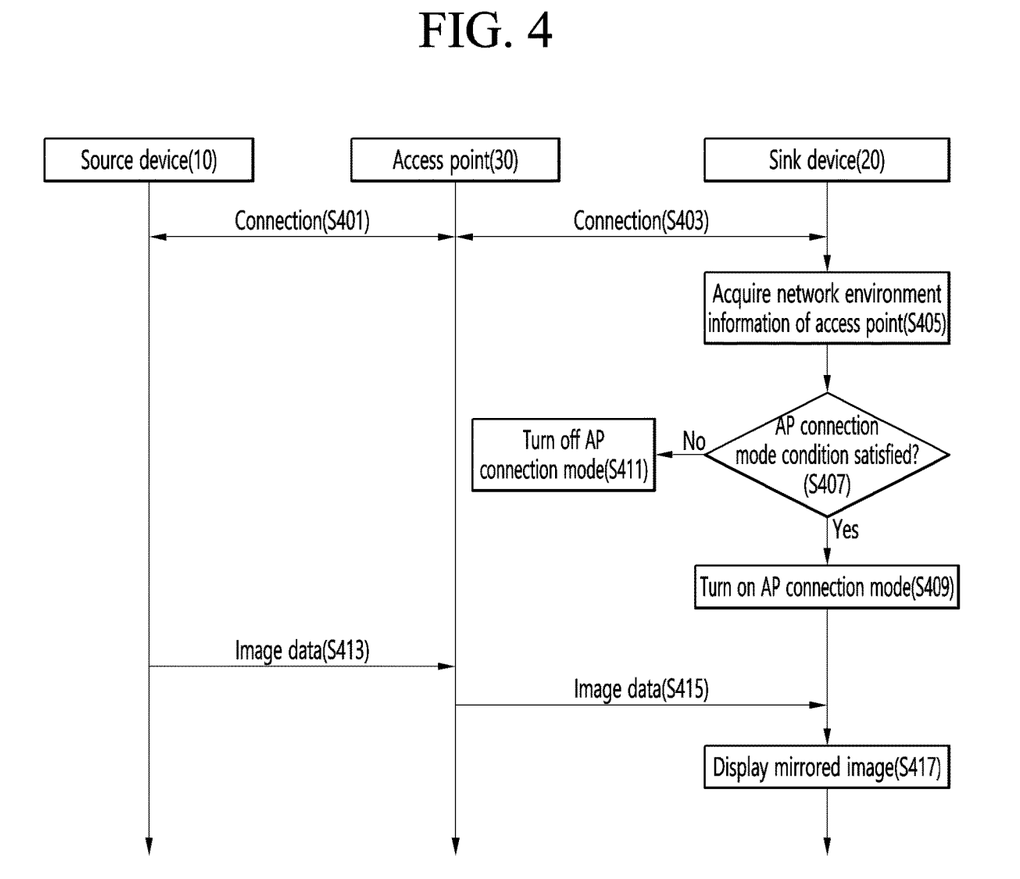
FIG. 4 is a ladder diagram illustrating a method of operating a wireless system according to an embodiment of the present disclosure.

FIG. 4 is a ladder diagram illustrating a method of operating a wireless system according to an embodiment of the present disclosure.

In particular, FIG. 4 is a view illustrating an embodiment in which, when the source device 10 and the sink device 20 are connected in the AP connection mode, the AP connection mode is maintained or turned off according to the network environment of the access point 30.

A wireless system according to an embodiment of the present disclosure may include the source device 10, the sink device 20 and the access point 30.

Referring to FIG. 4, the source device 10 is connected to the access point 30 (S401), and the sink device 20 is connected to the access point 30 (S403).

The access point 30 and the source device 10 may exchange information with each other in the connection process. The exchanged information may include some of the network environment information of the access point 30.

Similarly, the access point 30 and the sink device 20 may exchange information with each other in the connection process. The exchanged information may include some of the network environment information of the access point 30.

The access point 30 may be connected with the source device 10 and the sink device 20 through the Wi-Fi standard. To this end, the wireless communication interface of each of the source device 10 and the sink device 20 may include a Wi-Fi module.

The processor 25 of the sink device 20 acquires the network environment information of the access point 30 (S405).

In one embodiment, the sink device 20 may receive some of the network environment information of the access point 30 from the access point 30 in the connection process with the access point 30.

The network environment information of the access point 30 may include one or more of the connection frequency band, the frequency bandwidth, the received signal strength indication (hereinafter referred to RSSI) and response packet loss information of the access point 30.

The received signal strength may be a numerical value indicating the strength (or power) of the signal received by the sink device 20. The sink device 20 may transmit a ping signal, receive a response packet in response thereto, and acquire the signal strength of the response packet as a received signal strength.

The response packet loss information may include whether loss of the response packet responding to the ping signal, which is transmitted from the sink device 20 to the access point 30, occurs and a delay time of the response packet.

The sink device 20 may transmit the ping signal to the access point 30 multiple times, and determine whether the response packet has been received multiple times in response to the ping signal. The sink device 20 may determine that loss has not occurred in the response packet, when the number of times of receiving the response packet is equal to the number of times of transmitting the ping signal.

The sink device 20 may determine that loss has occurred in the response packet, when the number of times of receiving the response packet is less than the number of times of transmitting the response packet.

For example, when the sink device 20 transmits the ping signal to the access point 30 ten times and receives the response signal eight times, the sink device 20 may determine that loss has occurred in the response packet.

The sink device 20 may receive the connection frequency band and frequency bandwidth of the access point 30 from the access point 30 when being connected with the access point 30.

The sink device 20 may acquire RSSI and response packet loss information after connection with the access point 30.

The processor 25 of the sink device 20 determines whether an AP connection mode condition is satisfied based on the acquired network environment information of the access point 30 (S407).

The processor 25 of the sink device 20 may turn on (activate) the AP connection mode when the following four conditions are all satisfied based on the network environment information.

1. the case where the connected access point 30 is connected to a band of 5 GHz (first condition)

2. the case where the RSSI value of the connected access point 30 is equal to or greater than −65 dBm (second condition)

3. the case where the frequency bandwidth of the connected access point is equal to or greater than 40 MHz (third condition)

4. the case where the loss of the response packet does not occur and the delay time of the response packet is equal to or less than 50 ms when the ping signal is transmitted to the connected access point 30 (fourth condition)

The processor 25 of the sink device 20 may turn off (deactivate) the AP connection mode when any one of the first to fourth conditions is not satisfied.

The processor 25 of the sink device 20 turns on the AP connection mode upon determining that the AP connection condition is satisfied (S409).

When the AP connection mode is turned on, the sink device 20 may provide a screen sharing service through the AP connection mode with the source device 10.

The processor 25 of the sink device 20 turns off the AP connection mode when the AP connection mode condition is not satisfied (S411).

That is, the processor 25 of the sink device 20 may turn off the AP connection mode when any one of the first to fourth conditions is not satisfied based on the network environment information of the access point 30.

The processor 25 of the sink device 20 may perform a screen mirroring function in a P2P mode with the source device 10, when the AP connection mode is turned off.

Meanwhile, in the AP connection mode, the access point 30 receives image data for screen mirroring from the source device 10 (S413), and transmits the received image data to the sink device 20 (S415).

The sink device 20 may receive a screen mirroring request through the access point 30, and receive image data corresponding to the image displayed by the source device 10 from the access point 30 when responding to the screen mirroring request.

The processor 25 of the sink device 20 displays the mirroring image on the display 22 based on the received image data (S417).

The processor 25 of the sink device 20 may convert the received image data to suit resolution supported by the sink device 20 and display the mirroring image on the display 22.

According to the embodiment of the present disclosure, whether the AP connection mode is turned on or off may be determined based on the network environment information of the access point 30.

That is, the sink device 20 may automatically recognize the network environment of the access point 30 and provide the screen sharing service with the source device 10 in an appropriate connection mode.

Therefore, it is possible to prevent quality deterioration of the mirroring image.

Figure 5:
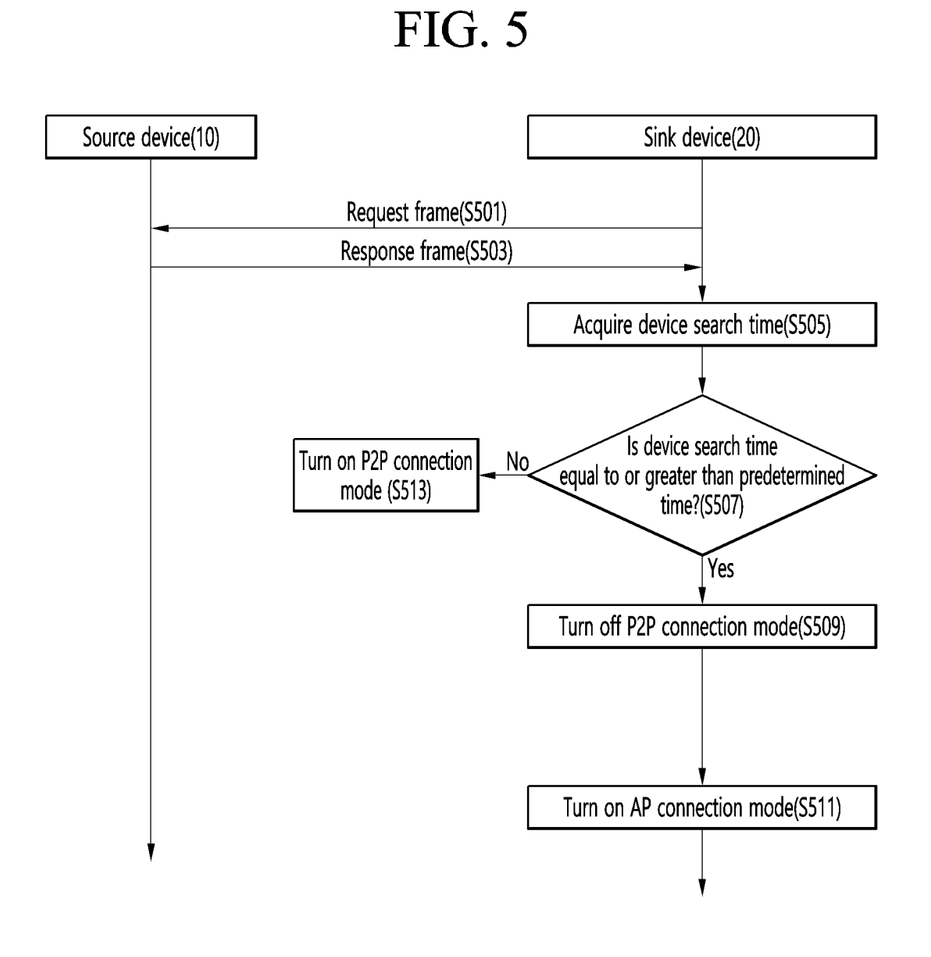
FIG. 5 is a flowchart illustrating a method of operating a wireless system according to another embodiment of the present disclosure.

FIG. 5 is a flowchart illustrating a method of operating a wireless system according to another embodiment of the present disclosure.

In particular, FIG. 5 is a view illustrating a process of determining whether a P2P connection mode is activated according to measurement of a device search time before P2P connection between the source device 10 and the sink device 20.

Referring to FIG. 5, the processor 25 of the sink device 20 transmits a request frame to the source device 10 through the wireless communication interface 21 (S501), and receives a response frame from the source device 10 (S503).

Steps S501 and S503 may be performed in the search mode S1016 described in FIG. 2. In this case, the request frame may be a probe request frame and a response frame may be a probe response frame.

The processor 25 of the sink device 20 acquires a device search time which is a time required to receive the response frame from a point of time when the request frame is transmitted (S505).

That is, the processor 25 may measure, as a device search time, a difference between a point of time when the request frame is transmitted to the source device 10 and a point of time when the response frame is received.

The processor 25 of the sink device 20 determines whether the device search time is equal to or greater than a predetermined time (S507).

The processor 25 of the sink device 20 turns off the P2P connection mode (S509) and turns on the AP connection mode, when the device search time is equal to or greater than the predetermined time (S511).

That is, the processor 25 may determine that screen mirroring through the P2P connection mode between the source device 10 and the sink device 20 is inappropriate and turn off the P2P connection mode, when the device search time is equal to or greater than the predetermined time.

The processor 25 may turn on the AP connection mode after turning off the P2P connection mode.

When the AP connection mode is turned on, the sink device 20 may perform the screen mirroring function with the source device 10 through the access point 30.

The processor 25 of the sink device 20 may turn on the P2P connection mode, when the device search time is less than the predetermined time (S513).

The processor 25 of the sink device 20 may determine that screen mirroring through screen mirroring with the source device 10 through the P2P connection mode is appropriate and activate the P2P connection mode, when the device search time is less than the predetermined time.

When the P2P connection mode is maintained, the sink device 20 may directly receive the image data from the source device 10 and display the mirroring image.

According to the embodiment of the present disclosure, the connection mode between the source device 10 and the sink device 20 may be set according to the device search time, thereby preventing the quality of the mirroring image from deteriorating.

Figure 6:
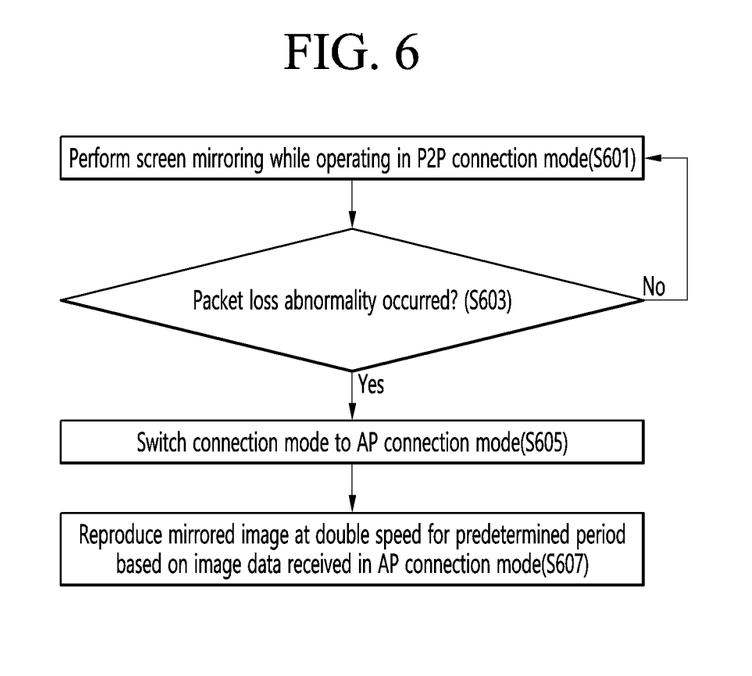
FIG. 6 is a view illustrating a method of operating a sink device according to an embodiment of the present disclosure.

FIG. 6 is a view illustrating a method of operating a sink device according to an embodiment of the present disclosure.

In particular, FIG. 6 is a view illustrating a process of switching the P2P connection mode to the AP connection mode as packet loss abnormality is detected, in a state in which the connection mode between the source device 10 and the sink device 20 is set to the P2P connection mode.

Referring to FIG. 6, the sink device 20 performs screen mirroring with the source device 10c while operating in the P2P connection mode (S601).

For example, the sink device 20 may directly receive the image data from the source device 10 using the Wi-Fi Direct standard and display the mirroring image on the display 22 based on the received image data.

The processor 25 of the sink device 20 determines whether packet loss abnormality has occurred while operating in the P2P connection mode (S603).

In one embodiment, the processor 25 may determine that packet loss abnormality has occurred when packet loss has occurred more than a predetermined number of times within a predetermined time.

Here, the predetermined time may be 4 seconds and the predetermined number of times may be 3, but this is merely an example.

The processor 25 may determine that packet loss abnormality has occurred, when packet loss continuously has occurred more than a predetermined number of times within the predetermined time.

Packet loss may occur when the response packet to the ping signal, which is transmitted from the sink device 20 to the source device 10, is not received.

The processor 25 may switch the P2P connection mode to the AP connection mode, when packet loss continuously has occurred three times within four seconds.

The processor 25 may turn off the P2P connection mode when packet loss continuously has occurred three times within four seconds and attempt connection with the source device 10 in the AP connection mode at the time of next connection.

The processor 25 of the sink device 20 switches the connection mode from the P2P connection mode to the AP connection mode, upon determining that packet loss abnormality has occurred (S605).

The processor 25 of the sink device 20 reproduces the mirroring image based on the image data received from the source device 10 at a double speed for a predetermined period, after switching the connection mode (S607).

When the connection mode is switched, until switching of the connection mode is completed, the image data may not be transmitted to the sink device 20. During a period in which the connection mode is switched, the sink device 20 may display a black screen or the screen may be blinked.

That is, when the connection mode is switched, transmission of the image data may be delayed.

As a solution to transmission delay of the image data, the processor 25 may reproduce the mirroring image corresponding to the received image data at a double speed for the predetermined period, after switching of the AP connection mode is completed.

The predetermined period may be a reproduction period corresponding to a time required to switch the connection mode from the P2P connection mode to the AP connection mode.

The sink device 20 may measure a delay time required to switch the connection mode from the P2P connection mode to the AP connection mode, and increase the reproduction speed of the mirroring image by the delay time.

Therefore, unnatural reproduction caused by switching the connection mode may be solved.

However, this is merely an example, and the sink device 20 may display a still image based on the last received image data in the P2P connection mode until switching of the connection mode is completed. That is, the sink device 20 may display a still image for the delay time and then continuously display the mirroring image based on the received image data in the AP connection mode.

Figure 7:
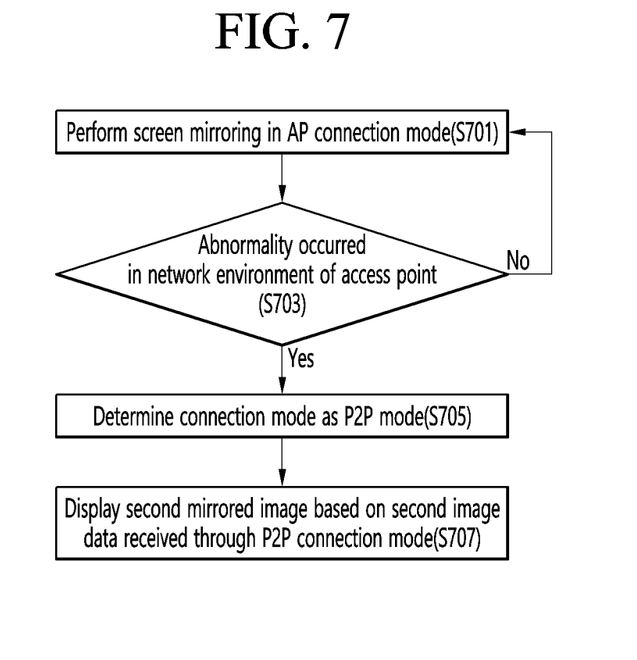
FIG. 7 is a view illustrating a method of operating a sink device according to another embodiment of the present disclosure.

FIG. 7 is a view illustrating a method of operating a sink device according to another embodiment of the present disclosure.

In particular, FIG. 7 is a view illustrating a process of switching the AP connection mode to the P2P connection mode when abnormality occurs in the network environment of the access point 30 in a state in which the connection mode between source device 10 and the sink device 20 is set to the AP connection mode.

Referring to FIG. 7, the sink device 20 performs screen mirroring with the source device 10 while operating in the AP connection mode (S701).

The processor 25 of the sink device 20 determines whether abnormality has occurred in the network environment of the access point 30 while operating in the AP connection mode (S703).

In one embodiment, the processor 25 may determine that packet loss abnormality has occurred when packet loss has occurred more than a predetermined number of times within the predetermined time.

That is, the processor 25 may determine that abnormality has occurred in the network environment, when the response packet to the ping signal, which is transmitted from the sink device 20 to the access point 30, is not received within the predetermined time.

More specifically, the processor 25 may determine that abnormality has occurred in the network environment, when packet loss continuously has occurred more than the predetermined number of times within the predetermined time.

In another embodiment, the processor 25 may determine that abnormality has occurred in the network environment of the access point 30, when any one of the first to fourth conditions for the AP connection mode described in FIG. 4 is not satisfied.

To this end, the sink device 20 may periodically acquire the network environment information of the access point 30.

In particular, the sink device 20 may determine whether loss has occurred in the response packet, periodically measure the delay time of the response packet, and periodically determine whether abnormality has occurred in the network environment of the access point 30.

The processor 25 of the sink device 20 switches the connection mode from the AP connection mode to the P2P connection mode (S705), upon determining that abnormality has occurred in the network environment of the access point 30 (S705).

The processor 25 of the sink device 20 reproduces the mirroring image based on the image data received from the source device 10 at a double speed for the predetermined time after switching the connection mode (S707).

As a solution to transmission delay of the image data, the processor 25 may reproduce the mirroring image corresponding to the received image data at a double speed for the predetermined period, after switching to the P2P connection mode is completed.

Therefore, unnatural reproduction caused by switching the connection mode may be solved.

However, this is merely an example, and the sink device 20 may display a still image based on the last received image data in the AP connection mode until switching of the connection mode is completed. That is, the sink device 20 may display a still image for the delay time and then continuously display the mirroring image based on the received image data in the P2P connection mode.

Figure 8:
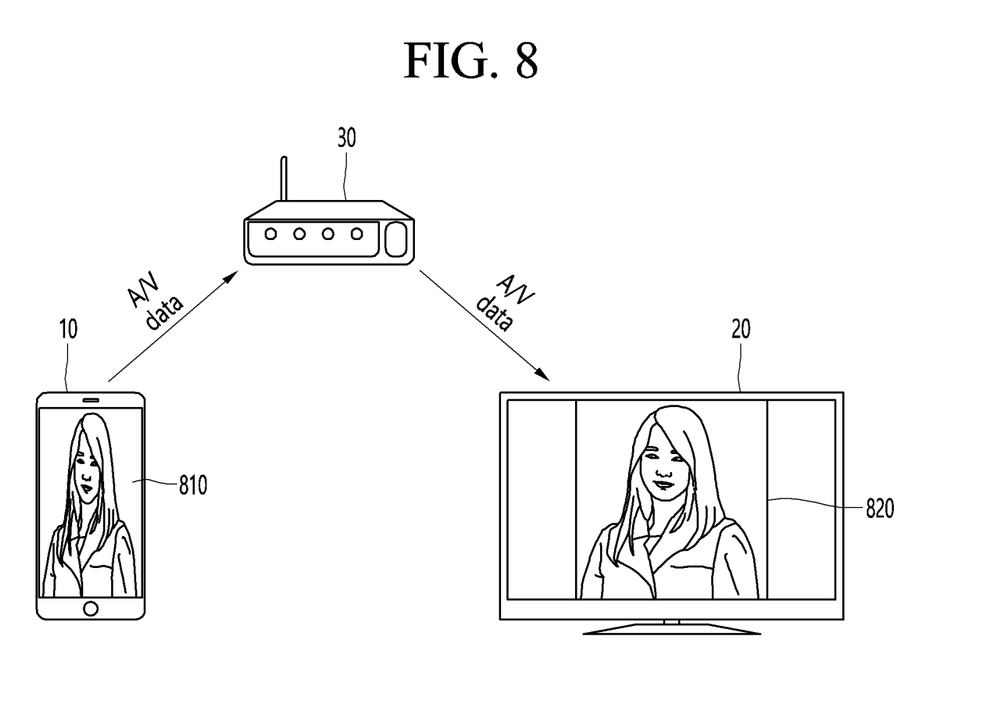
FIG. 8 is a view illustrating a process of performing screen mirroring in an AP connection mode according to an embodiment of the present disclosure.
Figure 9:
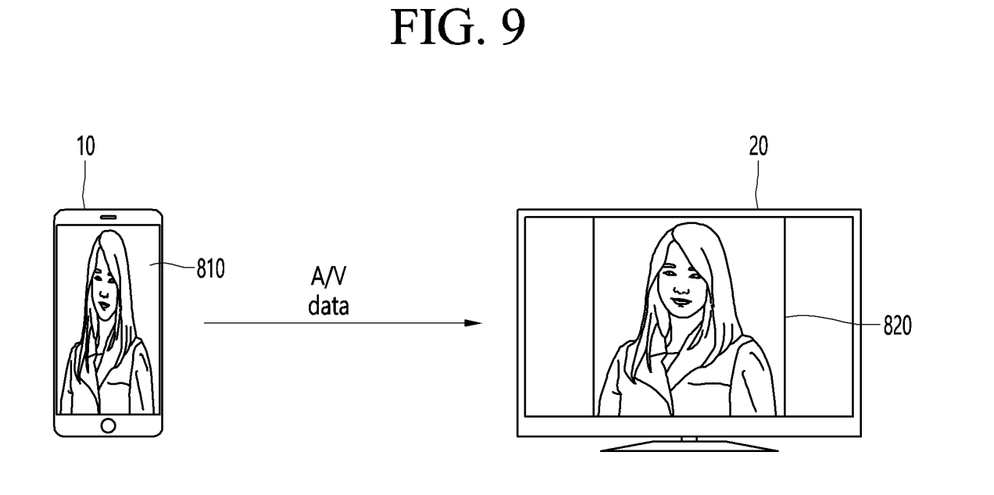
FIG. 9 is a view illustrating a process of performing screen mirroring in a P2P connection mode.

FIG. 8 is a view illustrating a process of performing screen mirroring in an AP connection mode according to an embodiment of the present disclosure, and FIG. 9 is a view illustrating a process of performing screen mirroring in a P2P connection mode.

Referring to FIG. 8, the source device 10 may transmit A/V data (audio/video data) corresponding to a source image 810, which is being displayed, to the access point 30.

The access point 30 may transmit the A/V data received from the source device 10 to the sink device 20.

The sink device 20 may display the mirroring image 820 based on the received A/V data.

Referring to FIG. 9, the source device 10 may directly transmit the A/V data to the sink device 20 without the access point 30. The sink device 20 may display the mirroring image 820 based on the received A/V data.

The sink device 20 may dynamically switch the connection mode depending on whether packet loss abnormality has occurred or whether abnormality has occurred in the network environment of the access point 30. This has been described in detail with reference to FIGS. 6 and 7.

Figure 10:
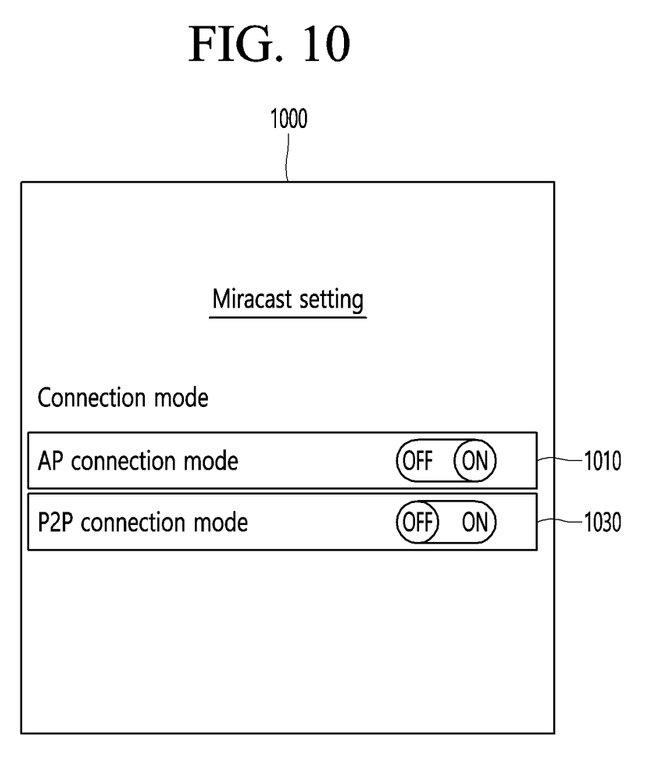
FIG. 10 is a view illustrating a menu for setting a connection mode for screen mirroring according to an embodiment of the present disclosure.

FIG. 10 is a view illustrating a menu for setting a connection mode for screen mirroring according to an embodiment of the present disclosure.

The menu 1000 shown in FIG. 10 may be displayed on the sink device 20 without being limited thereto and may also be displayed on the source device 10.

That is, the connection mode may be set in the sink device 20 and the source device 10.

The menu 1000 may include an AP connection mode item 1010 for setting on or off of the AP connection mode and a P2P connection mode item 1030 for setting on or off of the P2P connection mode.

A user may manually set on/off of the AP connection mode and the P2P connection mode through the menu 1000.

Meanwhile, when both the AP connection mode and the P2P connection mode are turned on, the AP connection mode may take precedence over the P2P connection mode.

That is, the sink device 20 may first establish connection with the source device 10 through the AP connection mode when both the AP connection mode and the P2P connection mode are turned on.

According to various embodiments of the present disclosure, since a screen sharing service is provided according to a connection mode reflecting a network environment, it is possible to prevent the quality of a mirroring image from deteriorating.

Therefore, a user may view the mirroring image having good quality.

According to an embodiment of the present disclosure, the above-described method can be implemented as a processor-readable code on a medium on which a program is recorded. Examples of the processor-readable medium include ROMs, RAMS, CD-ROMs, magnetic tapes, floppy disks, and optical data storage devices.

The display device described above is not limited to the configuration and method of the above-described embodiments, all or some of the above-described embodiments may be selectively combined so that various modifications may be made.

What is claimed is:

1. A wireless device comprising:
   a display;
   a wireless communication interface configured to wirelessly perform communication with an external device; and
   a processor configured to:
   activate any one of a first connection mode for performing a screen mirroring with the external device through an access point or a second connection mode for performing the screen mirroring with the external device through a direct connection based on a network environment representing a network quality,
   receive, from the external device, image data corresponding to a source image being displayed on the external device according to the activated connection mode and display, on the display, a mirroring image based on the received image data,
   cause a display of a still image corresponding to a last received image data on the display until switching of the connection mode is completed when the first connection mode is switched to the second connection mode, and
   reproduce the mirroring image corresponding to the received image data at a double speed for a predetermined period when the first connection mode is switched to the second connection mode.

2. The wireless device of claim 1, wherein the processor is further configured to: acquire network environment information of the access point and activate the first connection mode when a condition for the first connection mode is satisfied based on the acquired network environment information.

3. The wireless device of claim 2, wherein the network environment information includes a connection frequency band, a frequency bandwidth, a received signal strength indication (RSSI) and response packet loss information of the access point.

4. The wireless device of claim 3, wherein the processor is further configured to determine that the condition for the first connection mode is satisfied, when the connection frequency band is a specific frequency band, the frequency bandwidth is equal to or greater than a specific frequency bandwidth, a value of the RSSI is equal to or greater than a specific value, and the response packet loss information indicates that loss of a response packet does not occur and a delay time of the response packet is equal to or less than a specific time.

5. The wireless device of claim 3, wherein the processor is further configured to:
receive the connection frequency band and the frequency bandwidth of the access point from the access point, and
measure a signal strength of a response packet corresponding to a ping signal transmitted to the access point as a value of the RSSI, determine whether loss of the response packet occurs, and measure a delay time of the response packet.

6. The wireless device of claim 1, wherein the processor is further configured to:
measure a search time required to search for the external device and activate the first connection mode when the measured search time is equal to or greater than a predetermined time, and
activate the second connection mode when the search time is less than the predetermined time.

7. The wireless device of claim 6, wherein the processor is further configured to measure, as the search time, a difference between a point of time when a request frame is transmitted to the external device and a point of time when a response frame responding to the request frame is received.

8. The wireless device of claim 1, wherein the processor is further configured to switch the second connection mode to the first connection mode, when packet loss abnormality occurs in a state of performing operation in the second connection mode.

9. The wireless device of claim 8, wherein the processor is further configured to determine that packet loss abnormality continuously has occurred more than a predetermined number of times within a predetermined time.

10. The wireless device of claim 1, wherein the processor is further configured to switch the first connection mode to the second connection mode, when abnormality occurs in a network environment of the access point in a state of performing operation in the first connection mode.

11. A method of operating a wireless device, the method comprising:
activating any one of a first connection mode for performing a screen mirroring with an external device through an access point or a second connection mode for performing the screen mirroring with the external device through a direct connection based on a network environment;
receiving, from the external device, image data corresponding to a source image being displayed on the external device according to the activated connection mode;
displaying, on a display of the wireless device, a mirroring image based on the received image data;
displaying, on the display, a still image corresponding to a last received image data until switching of the connection mode is completed when the first connection mode is switched to the second connection mode; and
reproducing the mirroring image corresponding to the received image data at a double speed for a predetermined period when the first connection mode is switched to the second connection mode.

12. The method of claim 11, further comprising acquiring network environment information of the access point,
wherein the activating includes activating the first connection mode when a condition for the first connection mode is satisfied based on the acquired network environment information.

13. The method of claim 12, wherein the network environment information includes a connection frequency band, a frequency bandwidth, a received signal strength indication (RSSI) and response packet loss information of the access point.

14. The method of claim 13, further comprising determining that the condition for the first connection mode is satisfied, when the connection frequency band is a specific frequency band, the frequency bandwidth is equal to or greater than a specific frequency bandwidth, a value of the RSSI is equal to or greater than a specific value, and the response packet loss information indicates that loss of a response packet does not occur and a delay time of the response packet is equal to or less than a specific time.

15. The method of claim 13, further comprising:
receiving the connection frequency band and the frequency bandwidth of the access point from the access point;
measuring a signal strength of a response packet corresponding to a ping signal transmitted to the access point as a value of the RSSI; and
determine whether loss of the response packet occurs and measuring a delay time of the response packet.

16. The method of claim 11, further comprising switching the second connection mode to the first connection mode, when packet loss abnormality occurs in a state of performing operation in the second connection mode.

17. The method of claim 16, further comprising determining that packet loss abnormality continuously has occurred more than a predetermined number of times within a predetermined time.

18. The method of claim 11, further comprising switching the first connection mode to the second connection mode, when abnormality occurs in a network environment of the access point in a state of performing operation in the first connection mode.

* * * * *